(12) United States Patent
Legros

(10) Patent No.: US 7,938,416 B2
(45) Date of Patent: May 10, 2011

(54) AIR SUSPENSION ADAPTER KIT

(75) Inventor: Derek Legros, Thunder Bay (CA)

(73) Assignee: LBC Contracting, Ltd., Thunder Bay, Ontario (CA)

( * ) Notice: Subject to any disclaimer, the term of this patent is extended or adjusted under 35 U.S.C. 154(b) by 0 days.

(21) Appl. No.: 12/105,573

(22) Filed: Apr. 18, 2008

(65) Prior Publication Data

US 2009/0261551 A1  Oct. 22, 2009

(51) Int. Cl.
*B60G 9/02* (2006.01)

(52) U.S. Cl. ..... 280/124.11; 280/124.116; 280/124.157; 280/6.15

(58) Field of Classification Search ............. 280/124.11, 280/124.128, 124.153, 6.15, 124.157, 6.151, 280/6.157, 6.159, 124.116
See application file for complete search history.

(56) References Cited

U.S. PATENT DOCUMENTS

| | | | | |
|---|---|---|---|---|
| 2,814,480 A * | 11/1957 | Clark et al. | | 267/256 |
| 2,957,593 A | 10/1960 | Evans | | |
| 2,998,264 A * | 8/1961 | Stump | | 280/124.157 |
| 3,014,713 A * | 12/1961 | Fenton | | 267/287 |
| 3,140,880 A * | 7/1964 | Masser | | 280/124.108 |
| 3,704,898 A * | 12/1972 | Schmidt | | 280/124.128 |
| 4,568,094 A * | 2/1986 | Lovell | | 280/6.151 |
| RE32,736 E * | 8/1988 | Lovell | | 280/6.151 |
| 4,934,733 A * | 6/1990 | Smith et al. | | 280/124.132 |
| 5,016,912 A * | 5/1991 | Smith et al. | | 280/6.151 |
| 5,366,237 A * | 11/1994 | Dilling et al. | | 280/124.116 |
| 5,765,859 A | 6/1998 | Nowell et al. | | |
| 6,068,276 A | 5/2000 | Kallstrom | | |
| 6,142,496 A | 11/2000 | Bartel | | |
| 6,328,324 B1 | 12/2001 | Fenton | | |
| 6,349,952 B1 | 2/2002 | Kallstrom | | |
| 6,382,647 B1 | 5/2002 | Smith | | |
| 6,508,482 B2 * | 1/2003 | Pierce et al. | | 280/124.116 |
| 6,665,597 B1 * | 12/2003 | Hanser et al. | | 701/37 |
| 6,679,509 B1 | 1/2004 | Galazin et al. | | |
| 6,857,647 B2 * | 2/2005 | Johnsman et al. | | 280/124.163 |
| 6,921,098 B2 | 7/2005 | VanDenberg et al. | | |
| 7,036,805 B2 * | 5/2006 | Renaudot | | 267/189 |
| 7,036,834 B2 | 5/2006 | Schluntz | | |
| 7,131,652 B2 * | 11/2006 | Ramsey | | 280/86.5 |
| 7,207,583 B2 * | 4/2007 | Ross et al. | | 280/124.121 |
| 7,306,239 B2 * | 12/2007 | Schutt et al. | | 280/5.514 |
| 7,416,200 B2 * | 8/2008 | Hass et al. | | 280/124.116 |
| 2001/0020775 A1 * | 9/2001 | Pierce et al. | | 280/124.128 |
| 2003/0067136 A1 | 4/2003 | Scott et al. | | |
| 2003/0098564 A1 | 5/2003 | VanDenberg et al. | | |
| 2003/0132593 A1 * | 7/2003 | Ross et al. | | 280/124.1 |

(Continued)

OTHER PUBLICATIONS

Hendrickson—Intraax Aanl 23K, (Hendrickson International Corporation) Mar. 2007, [online], [retrieved on Aug. 23, 2007 by WebArchive.com] Retrieved from Web Archive using Internet <URL: http://web.archive.org/web/20070823045422/http://www.hendrickson-intl.com/pdfs/trailer_PDFs/L958.pdf>.*

(Continued)

*Primary Examiner* — Paul N. Dickson
*Assistant Examiner* — Barry Gooden, Jr.
(74) *Attorney, Agent, or Firm* — Trevor C. Klotz

(57) ABSTRACT

A kit for providing an air suspension as a retrofit to an existing trailer using a leaf spring suspension makes use of hanging brackets, support arms and air bladders connected to a control system that determines whether the bladders require inflation or deflation to level the bed of the trailer.

6 Claims, 7 Drawing Sheets

U.S. PATENT DOCUMENTS

| | | | |
|---|---|---|---|
| 2003/0209872 A1* | 11/2003 | Baxter et al. | 280/124.128 |
| 2004/0155425 A1* | 8/2004 | Schluntz | 280/124.128 |
| 2005/0146110 A1* | 7/2005 | Dudding | 280/124.128 |
| 2005/0236792 A1* | 10/2005 | Hedenberg | 280/124.11 |
| 2006/0049600 A1* | 3/2006 | Dudding et al. | 280/124.11 |
| 2006/0175775 A1* | 8/2006 | Bolt et al. | 280/5.514 |
| 2006/0255557 A1* | 11/2006 | Hass et al. | 280/124.116 |
| 2006/0267296 A1* | 11/2006 | Dodd et al. | 280/5.512 |
| 2007/0108711 A1 | 5/2007 | Smith | |
| 2007/0145696 A1* | 6/2007 | Ramsey | 280/6.157 |
| 2007/0200312 A1* | 8/2007 | Chamberlin et al. | 280/124.116 |
| 2008/0284123 A1* | 11/2008 | Billian et al. | 280/124.116 |
| 2009/0079146 A1* | 3/2009 | Stahl et al. | 280/6.159 |

OTHER PUBLICATIONS

Dexter Axle—Airflx Light Trailer Suspention System brochure, retreived from http://i.b5z.net/i/u/1080235/f/Airflex_Flyer.pdf on Apr. 18, 2008.

* cited by examiner

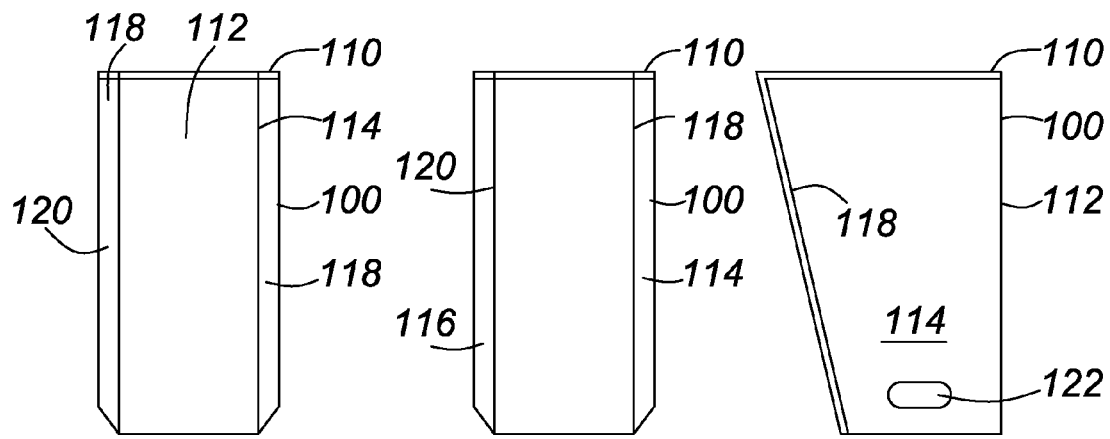
FIG. 3a  FIG. 3b  FIG. 3c
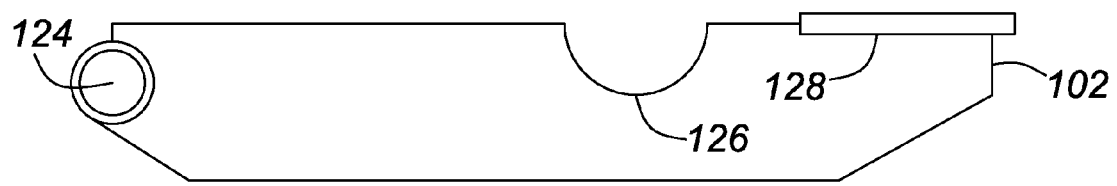
FIG. 4a
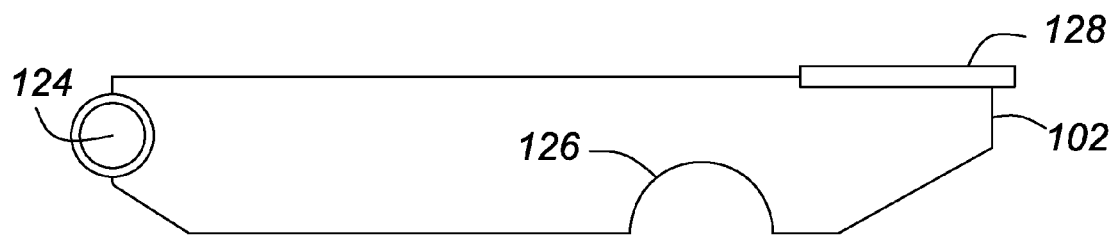
FIG. 4b

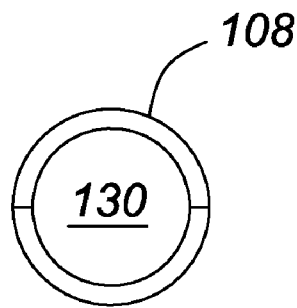
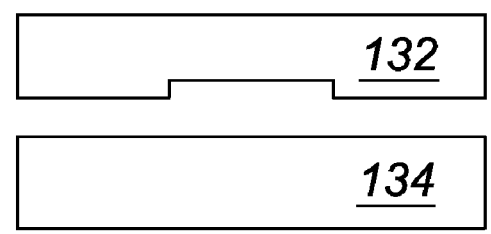
FIG. 5a   FIG. 5b
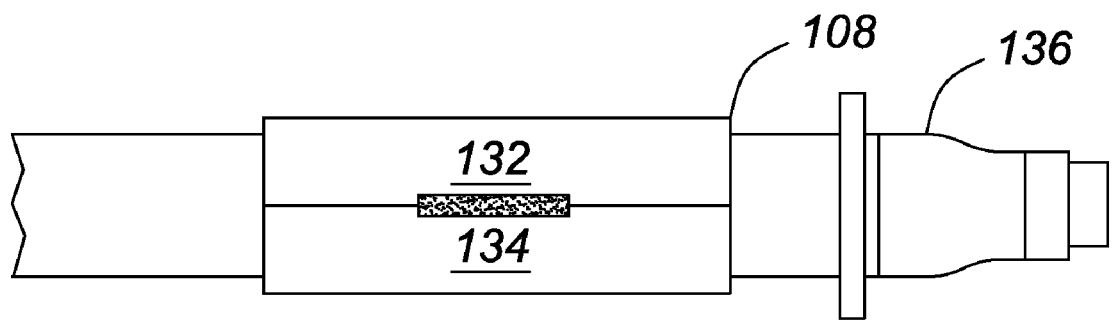
FIG. 5c

AIR SUSPENSION ADAPTER KIT

FIELD OF THE INVENTION

This invention relates generally to air suspensions for trailers such as small utility trailers, camper trailers and recreational vehicle trailers.

BACKGROUND OF THE INVENTION

Utility trailers are used to provide additional hauling capacity to standard automobiles and light trucks. They often connect to such a vehicle using a hitch, such as a conventional ball hitch. An electrical connection, typically through a connection to the brake light power source, is employed to enable brake lights at the rear of the utility trailer.

Conventionally, utility trailers have a single axle on which the trailer's wheels are mounted. By connecting to the hitch, the trailer is then supported at three points (the hitch and each of the wheels.) This leaves the trailer relatively level and stable. The axle is typically mounted to the trailer using a set of leaf springs. This provides a durable suspension system that effectively spreads the weight load widely over the chassis of the utility trailer.

On acknowledged problem with the use of leaf springs is their inability to vary the stiffness of the suspension in response to differing loading weights. To address this issue, pneumatic or air suspensions have been employed. The leaf spring is replaced by a compressible air bladder that can be variably inflated to different pressures. The air pressure in the bladder can be varied to accommodate different loads, and to adjust the stiffness of the suspension. One example of such a system is provided in U.S. Pat. No. 6,086,276, which discloses the use of an inflatable air bladder to act as a dampener for a partial axle.

The use of an air bladder also offers the ability to increase the functionality of a trailer by allowing the bed of the trailer to be lowered through deflation of the bladder. This effectively provides the ability to have the trailer "kneel" to allow easier access.

Despite the existence of air suspension trailers, the market for all small trailers is typically tilted towards sales of the lower cost leaf spring suspension trailers. Often a leaf spring suspension trailer is the first trailer that a person will purchase, and only when a second trailer is needed does a person consider buying an air suspension trailer As a well-maintained trailer often lasts a long time, many people who might be interested in the functional advantages of an air suspension system do not consider purchasing a new trailer because the existing trailer is fully serviceable.

Various air-suspension systems exist, including those provided by Dexter Axle, whose Airflex™ system is intended for use by trailer assembly and sales companies to use in air-suspension trailers. In conventional air-suspension systems an expensive air bladder is used as to dampen the vibrations encountered. As the loads placed on the bladder are large, the bladders must be designed to accept a large amount of compressive force when they are inflated without causing a blow out. This requires expensive bladders. Furthermore, the axle is connected to the air-suspension system using U-bolts that are secured through plates bolted to support arms. As the trailer is used on rougher surfaces, vibrations in the trailer often loosen the secure fit achieved by the U-bolts, resulting in a loosening of the axle, which is undesirable for a number of reasons that will be understood by those skilled in the art.

It is, therefore, desirable to provide a mechanism to allow owners of conventional trailers to obtain the benefits of an air suspension system for existing trailers.

SUMMARY OF THE INVENTION

It is an object of the present invention to obviate or mitigate at least one disadvantage of the prior art.

In a first aspect of the present invention, there is provided an air suspension kit for a trailer having a fixed axle. The kit comprises first and second hanger brackets, first and second support arms, first and second inflatable air bladders, first and second and an inflation control system. The first and second hanger brackets attaché to respective first and second side rails of the trailer. The first and second support arms connect to the respective first and second hanger brackets. Each support arm has a hanger bracket mount point at one end, an air bladder mounting surface at an opposing end of the arm, and an axle recess positioned between the two ends for receiving the axle. Each of the inflatable air bladders connect to the air bladder mounting surface of the respective support arm and the respective side rail. Each bladder can be used to increase and decrease the distance between the respective side rail and support arm in accordance with the quantity of air stored in the bladder. The inflation control system controls air flow into and out of the first and second air bladders to maintain alignment of the side rails and support arms in a predetermined configuration.

In an embodiment of the present invention, the kit includes a set of instructions for assembling the elements of the kit. The kit can further include first and second shock absorbers, each of the shock absorbers for connection between respective a hanger bracket and support arm. Each of the hanger brackets can include a side rail attachment surface for allowing of attachment of the hanger bracket to a side rail.

Each of the hanger brackets can also include a support arm mounting point, which optionally has a connection pin for connecting the support arm mounting point of the hanger bracket to the hanger bracket mount point on the support arm. The connection pin can include an alignment collar for allowing the alignment of each support arm to its respective side rail.

In an alternate embodiment, the axle recess on a support arm is sized to receive the axle in welded engagement. In another embodiment, the kit further includes first and second axle collars. The axle collars engage both the axle and the axle recesses in each of the first and second support arms respectively. The axle collar is preferably cylindrical with an inner diameter equal to the diameter of the axle and an outer diameter sized to fit inside the axle recesses. The axle collar and the support arms are preferably fashioned from a weldable material, and the axle collars are welded to both the support arms and the axle.

In a further embodiment, the inflation control system includes an air supply for providing a pressurized supply of air to the air bladders to inflate the bladders. The pressurized air supply can be provided by an air compressor, which is powered by a connection to a towing vehicle battery. The pressurized supply can further include a pressurized tank of air that is filled by the compressor. The pressurized tank can store pressurized air for transmission to the air bladders. The air compressor can be controlled by a regulator, so that the compressor provides air to the pressurized tank when the pressure of the pressurized tank falls below a predetermined level. The regulator can stop the compressor from providing air to the pressurized tank when the pressure in the pressurized tank exceeds a second predetermined level. The pressurized tank is preferably connected to the air bladders through a valve opened when the alignment of the siderails and support arms is not in the predetermined configuration due to excess loading of the trailer. The valve can be a three way ball valve for inflating the air bladders by connecting them to the pressurized tank when the alignment is not in the predetermined configuration due to excess loading, for deflating the air bladders by connecting them to the outside environment when the alignment is not in the predetermined configuration due to insufficient loading, and for sealing the bladders when the alignment is in the predetermined configuration.

In a further embodiment, the trailer can be one of a utility trailer, a camper trailer and a recreational vehicle trailer.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 3a illustrates a front view of a hanger bracket;

FIG. 3b illustrates a rear view of a hanger bracket;

FIG. 3c illustrates a side view of a hanger bracket;

FIG. 4a illustrates an under slung support arm;

FIG. 4b illustrates a top mount support arm;

FIG. 5a illustrates an assembled axle wrap from an end view;

FIG. 5b illustrates an exploded axle wrap from a side view;

FIG. 5c illustrates an axle wrap assembled around an axle from a side view;

FIG. 6b illustrates a cut-away of the air bladder illustrated in FIG. 6a;

DETAILED DESCRIPTION

The present invention is directed to a novel suspension system for utility trailers that can be installed as an aftermarket modification for fixed axle trailers.

Reference is made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

Figure 1:
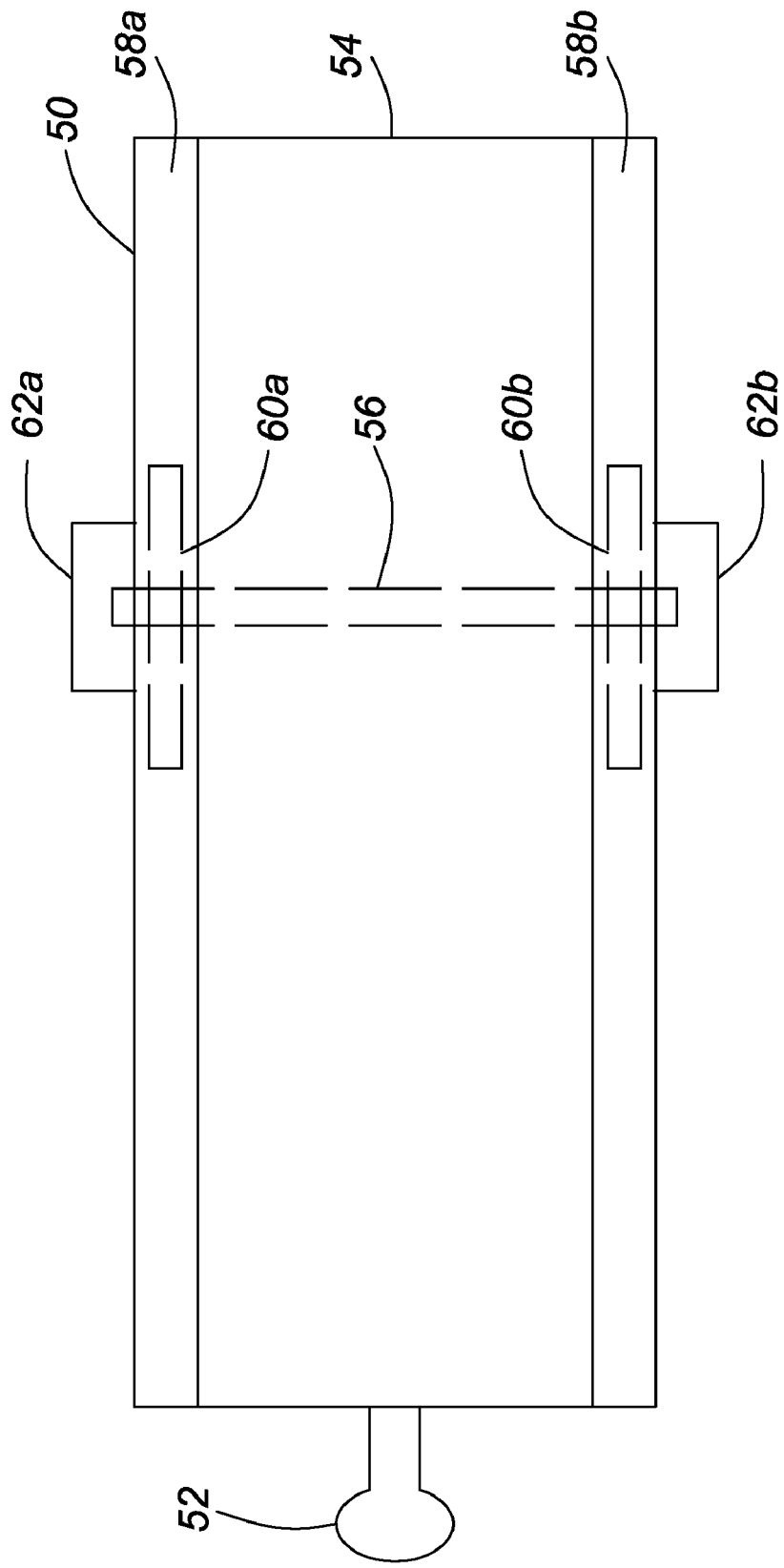
FIG. 1 illustrates a conventional leaf spring suspension trailer.

FIG. 1 illustrates an exemplary embodiment of a conventional trailer using leaf springs and a fixed axle. The trailer 50 has a hitch 52 for connecting to a vehicle and a load gate 54 at the opposing end. An axle 56 is fixedly mounted to the side rails 58a and 58b by leaf springs 60a and 60b respectively. Wheels 62a and 62b are mounted to the axle 56 to allow them to rotate freely. The leaf springs 60 serve as a suspension by flexing under pressure.

To serve as an after market modification, or as a set of elements for use in primary assembly, the present invention provides support for the fixed axle of the prior art trailer illustrated in FIG. 1.

Figure 2:
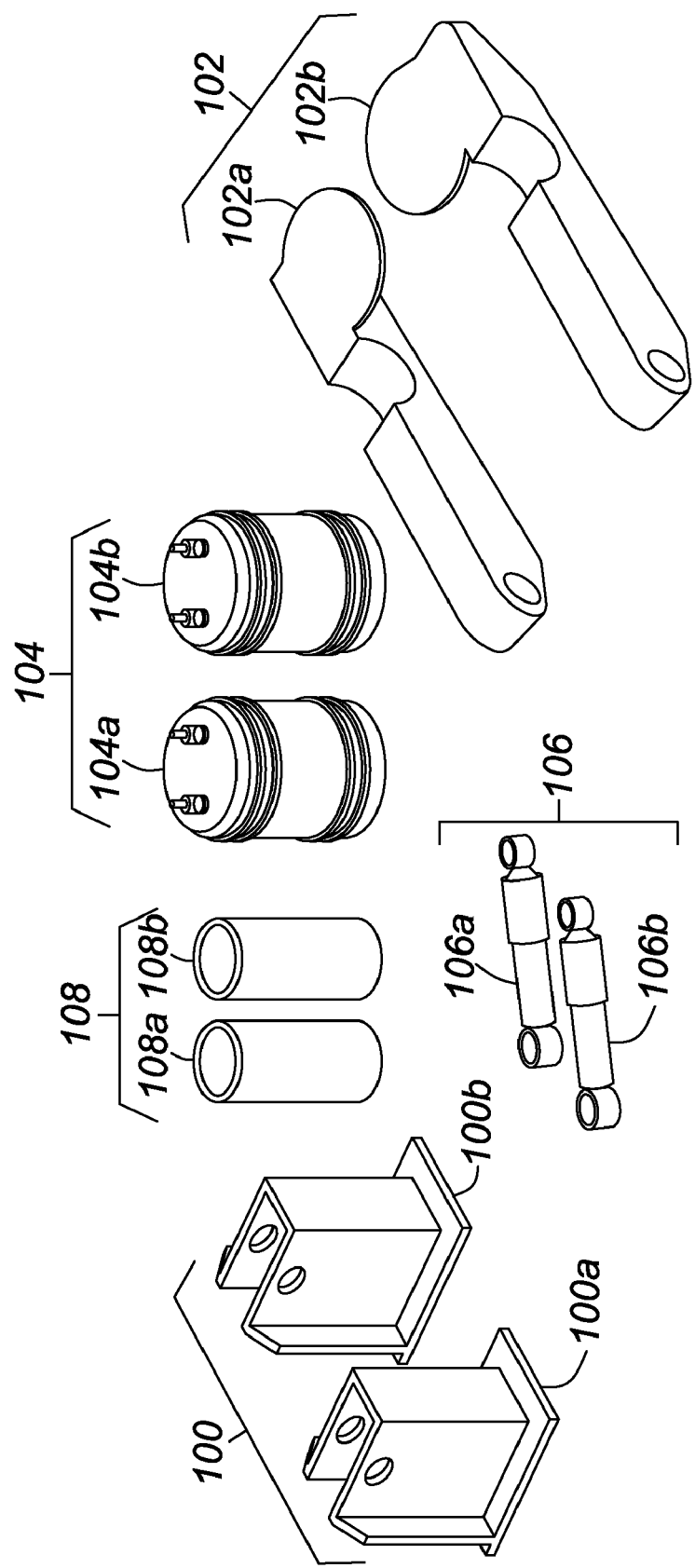
FIG. 2 illustrates a set of parts for an air suspension system.

FIG. 2 illustrates a set of parts that can be provided as a kit for implementing the trailer suspension system of the present invention in place of the leaf-spring suspension of the prior art. The kit includes a pair of hanger brackets 100 (individually referred to as hanging bracket 100a and 100b) for mounting in the underside of the trailer; a pair of support arms 102 (individually referred to as support art 102a and 102b) each of the arms for pivotal connection to one of the hanger brackets 100; air bladders 104 (individually referred to as 104a and 104b), optional shock absorbers 106 (individually referred to as shock absorber 106a and 106b) and optional axle wraps 108 (individually referred to as axle wraps 108a and 108b).

The support arms 102 can be pivotally connected to the hanging brackets 100, which serve to space the support arms 102 from the underside of the trailer. Each of these support arms 102 has a mounting surface for supporting the air bladders 104. Optionally, the shock absorbers 106 can be used to provide a second connection between the hanging brackets 100 and the suspension arms 102. The shock absorbers 106 can be used to damp the pivotal motion between the support arms and the hanging brackets. Support arms 102 also include a mounting recess for supporting the axle. Proper fit of the axle in the recess can be obtained using axle wraps 108 which adapt the diameter of an axle to the possibly larger diameter of the mounting recesses.

The elements of the above-described kit will now be described in further detail. The assembly of the elements and the use of a control system will be discussed following the discussion of each element.

FIGS. 3a 3b and 3c show the front, rear and side views respectively of an exemplary hanger bracket 100. Hanger bracket 100 has a top plate 110 that allows bracket 100 to be mounted to the underside of a trailer. A front wall 112 connects sidewalls 114 and 116 to each other. Rear flange 118 is connected to sidewall 114, while rear flange 120 is connected to side wall 116. Sidewalls 114 and 116, rear flanges 118 and 120 and front wall 112 are all connected to top plate 110. As shown in FIG. 3c, sidewall 114 includes an aperture 122 (a similar aperture exists on sidewall 116 though is unillustrated). The aperture 122 allows for pivotal mounting of the support arm 102. The use of an ovoid aperture 122 allows for the use of an alignment collar to align the suspension arms so that they are parallel to the side rails of the underside of the trailer even if the hanging bracket is slightly misaligned. One skilled in the art will appreciate that apertures of other shapes and designs can be used without departing from the scope of the present invention.

FIGS. 4a and 4b illustrate alternate embodiments of the support arm 102 shown in FIG. 2. In FIG. 4a, an under slung support arm 102 is shown. A mounting point 124 is provided at one end of the mounting arm 102. This mounting point is designed for mating with the aperture 122 on hanging bracket 100. In the illustrated embodiment, the mounting point 124 is an aperture that can be aligned to with aperture 122 and connected using a standard bolt, and alignment collars, as will be understood by those skilled in the art. When assembled, a pair of hanging brackets 100 each have a support arm 102 connected to them, and the support arms 102 are connected to each other by the axle. The axle is then aligned with the trailer side rails, by adjusting the mounting point 124 in the aperture 122 on the hanging bracket 100 using alignment collars. One skilled in the art will appreciate that the alignment process is provided to account for manufacturing and assembly variations, though a sufficiently precise manufacturing and installation process can obviate the need for alignment collars.

Set away from the mounting point 124 is the mounting recess 126 which mates with the axle of the trailer. One skilled in the art will appreciate that mounting arm 102 is referred to as an under slung arm because it supports the axle in mounting recess 126 from below. At the far end of the support arm 102 from the mounting point 124 is mounting surface 128 which is designed to support the air bladder, such as bladder 104 of FIG. 2. One skilled in the art will appreciate that alternate designs of the present invention can change the relative positioning of the mounting recess 126 and the mounting surface 128.

FIG. 4b illustrates an alternate embodiment of support arm 102, a top mount arm as opposed to the under slung arm of FIG. 4a. Mount point 124 and mounting surface 128, each with the same configuration as shown in FIG. 4a is shown. However, in this instance, the mounting bracket is slung over the axle, so mounting recess 126 is provided on the underside of the arm as illustrated. One skilled in the art will appreciate that mounting recess 126 is designed to accommodate the axle of the trailer in a fixed mounting. In place of the conventional bolts, a permanent mounting mechanism is preferably used. The axle can be bonded to the support arm through a welding process, or through another permanent connection. This prevents the gradual loosening that plagues prior art implementations that rely upon bolts.

FIG. 5a illustrates the axle wrap 108 in an end view. This wrap is cylindrical in shape with a central aperture 130 sized to accept the existing axle of the trailer. The external surface of wrap 108 is sized to fit within the mounting recess 126. Wrap 108 is illustrated as being a two part assembly that forms a clamshell style connection around the axle. On skilled in the art will appreciate that the two part assembly illustrated is simply an exemplary embodiment, one part assemblies can be used without departing from the scope of the present invention. A two part assembly provides ease of assembly in comparison to a one piece wrap when the wheels have already been fitted to an axle as is the case in retrofitting an existing trailer, while a one piece assembly can provide simplicity and ease of use for new installations. The wrap 108 can secured in the recess 126 by welding or another permanent binding process. Welding is employed, between the axle wrap and the axle, and the axle wrap and the recess, to ensure a secure and permanent bond. Conventional air-suspension systems have attempted to move towards ease of assembly, which is important in an assembly line setup, and have thus avoided using permanent connections such as welds in favor of U-bolts with locking nuts. Though bolt and nut connections are relatively secure, they tend to become less secure as time progresses as the trailer is subjected to vibrations. Excessive vibrations, often caused by poorly maintained roads or unpaved surfaces, are known for loosening these connections. As the connections are loosened, the axle can become misaligned which increases the need for the user to have the trailer serviced. The use of a permanent bonding, such as a weld, greatly mitigates this problem at the expense of a more difficult installation.

FIG. 5b illustrates the front view of the wrap 108 in exploded form. Wrap 108 is formed of two complementary pieces, such as wrap halves 132 and 134. The pieces are placed around an axle and are then welded together to form a solid piece. Once again, other permanent fastening mechanisms other than welding can be employed without departing from the scope of the present invention. FIG. 5c illustrates different assembled complimentary halves 132 and 134 of axle wrap 108 enclosing an axle 136. As indicated above, a weld can be employed to fixedly connect the two halves.

Figure 6A:
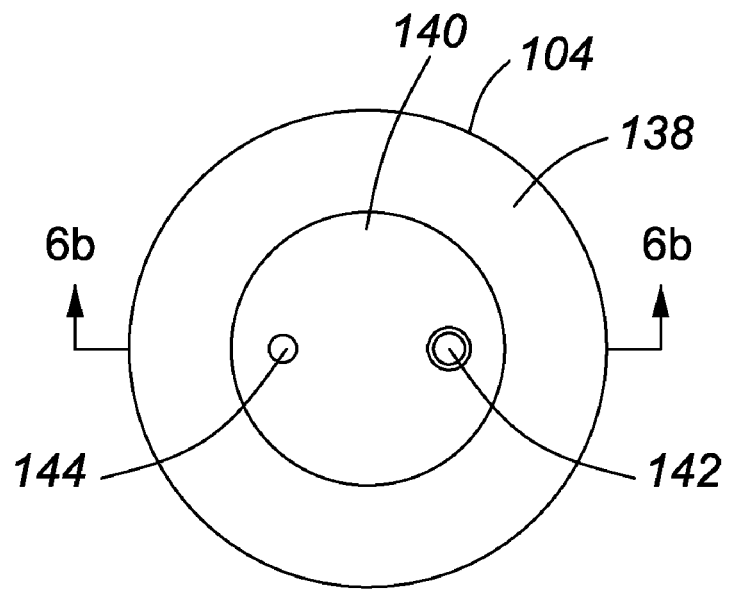
FIG. 6a illustrates an air bladder from a top view.

FIG. 6a illustrates a top view of the air bladder 104 of the present invention. An inflatable bladder 138 is arranged around a top support plate 140. The inflatable bladder 138 receives and discharges air from inflation valve 142 which, along with support point 144, is supported on top support plate 138.

Figure 6B:
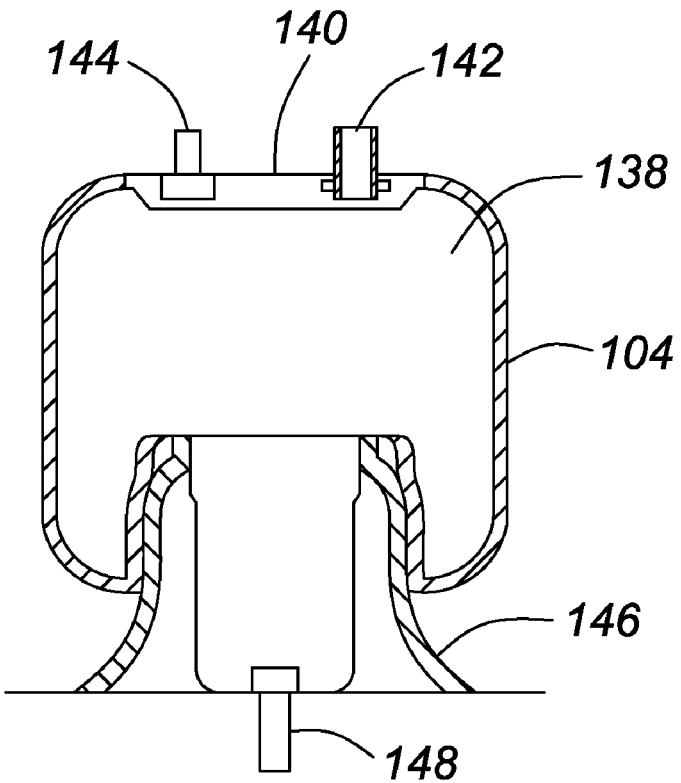

FIG. 6b illustrates the air bladder 104 from a side view. The air bladder 104 has inflatable bladder 138, top support plate 140, air valve 142 and support point 144, as shown in FIG. 6a. The bladder is supported by base 146, which provides a mounting point 148 for connecting the air bladder 104 to the mounting surface 128 of the support arm 102. The valve 142 and support point 144 are used to connect the air bladder 104 to the underside of the trailer. Thus, air bladder 104 is used to dampen motion of the support arm 102 with respect to the base of the underside of the trailer.

Figure 7:
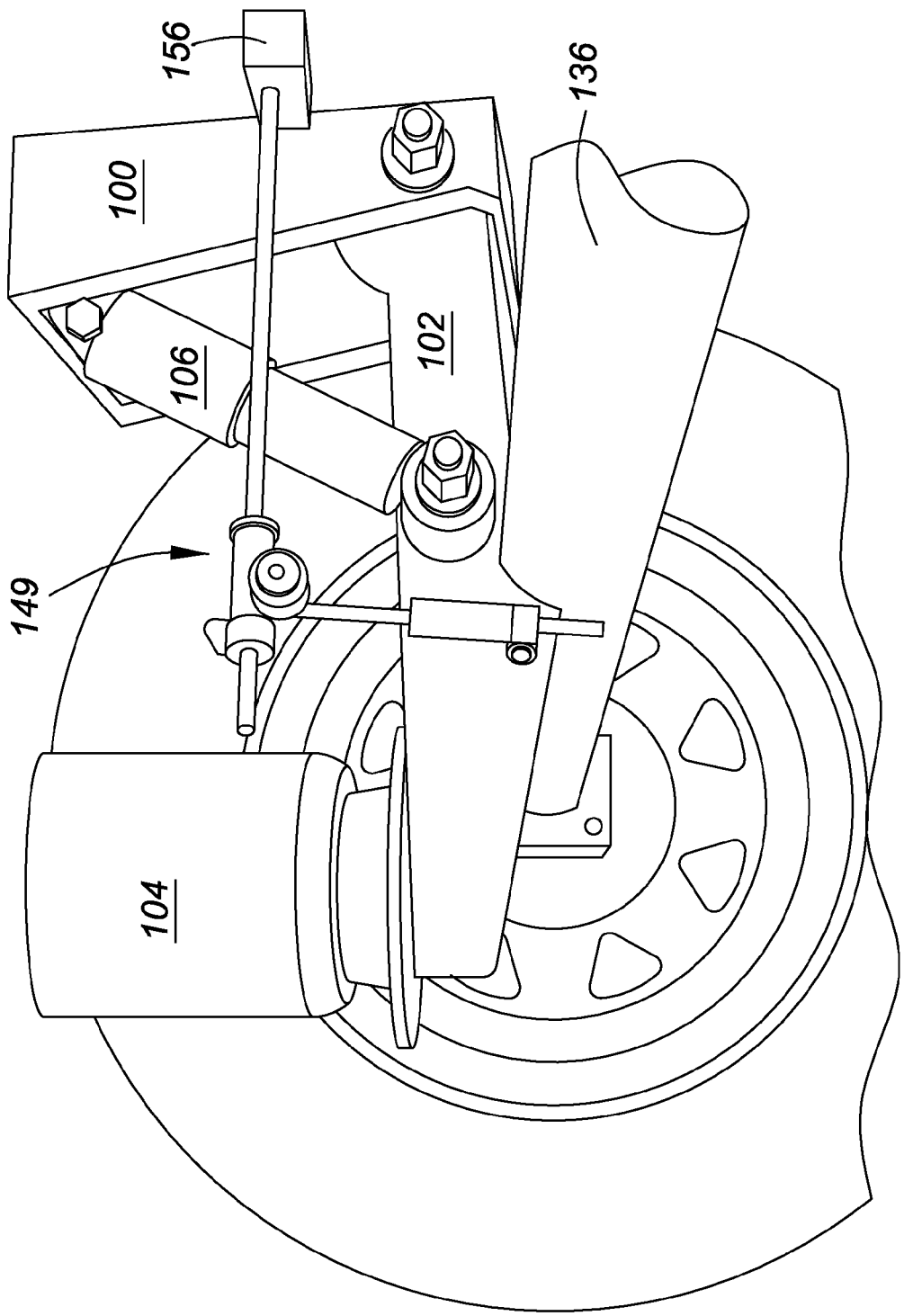
FIG. 7 illustrates the assembly of the elements of FIG. 2 to provide an air suspension system.

FIG. 7 illustrates the above-described elements assembled and used as a suspension system for a fixed axle trailer. Hanging bracket 100 is mounted on the underside of the trailer, and is pivotally connected to the support arm 102 through the use of a bolt that serves as a pivot point through aperture 122 and mounting point 124. The air bladder 104 is supported on the mounting surface 128, and supports the underside of the trailer to maintain a height roughly equivalent to the height of the hanging bracket 100. This keeps the trailer bed level, which is commonly desired. The support arm 102 is fixedly connected to the axle 136, which has freely rotating wheels. The shock absorber 106 is mounted on an angle between the mounting arm 102 and the hanging bracket 100 to aid the air bladder 104 in ensuring that oscillations caused by driving over uneven surfaces are dampened.

Also shown in FIG. 7 is an element of a sensor system used to determine if the trailer bed is maintained at a desired level. A connected pair of rods 149 is connected to a sensor 156. The pair of rods 149 is connected so that one of the rods is parallel to the support arm 102, and the other rod is fixedly mounted to either the support arm 102 or the axle 136. Sensor 156 is set to recognize an accepted neutral position, preferably one where the bed of the trailer is level. When the pressure in air bladder 104 is too high, the trailer bed will be lifted above the level position. This will exert a downward pressure on the support arm 102, and will increase the angle between the support arm 102 and the hanger bracket 100. This difference in angle will be mirrored in the connection of the pair of rods 149 to the sensor 156. Similarly, when the pressure in air bladder 104 is below the desired level, angle between the support arm 102 and the hanger bracket 100 will be decreased. This decreased angle will be mirrored in the connection between the pair of rods 149 to the sensor 156. By detecting these differences in angles, sensor 156 can control the inflation and deflation of the air bladder 104. One skilled in the art will appreciate that this configuration is merely exemplary, and any number of other configurations can be employed, including the use of sensors that directly measure the distance between the support arm 102 and the trailer bed, or sensors that directly measure the angle between the support arm 102 and the hanger bracket 100. It should be noted that sensor 156 can be described as a ride height sensor.

Figure 8:
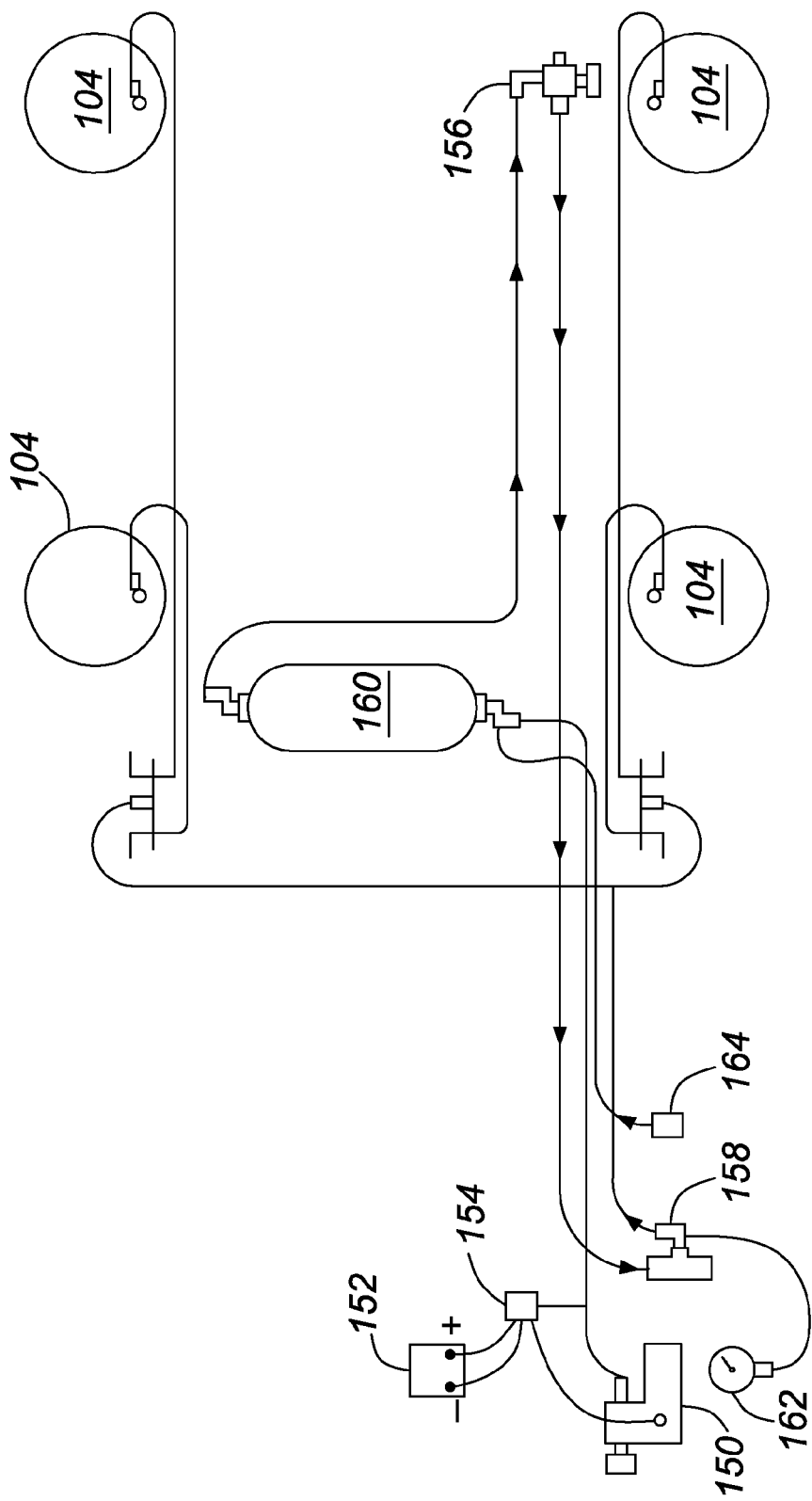
FIG. 8 illustrates a control system for determining and maintaining the level and air pressure in the suspension system.

FIG. 8 illustrates an exemplary embodiment of such a control system used on a trailer bed with multiple axles. One skilled in the art will appreciate that an axle can be supported by a pair of air bladders, and multiple axle trailers can be accommodated by increasing the number of bladder pairs.

Multiple axles can be controlled using a single sensor system as illustrated in FIG. 8, or can employ a multiple sensor system, wherein each axle is independently monitored. Those skilled in the art will appreciate the modifications to the control system that would be required are not substantive, and can also be accomplished through the use of multiple independent control systems. Air bladders 104 rely upon an air source, such as compressor 150, which draws power from a source 152 such as the vehicle that is towing the trailer. As noted earlier, it is often possible to connect to a vehicle power system for such tasks as operating marker lights. A similar connection to power source 152 can be provided. In alternate embodiments, a standalone power supply can be provided. The connection between power supply 152 and compressor 150 is made through regulator 154 which in conjunction with sensor 156 determines whether air pressure should be maintained or increased. Sensor 156, in the presently illustrated embodiment, can be implemented as a leveling valve that can serve to increase or decrease the pressure in the air bladders 104 as needed. If a decrease in air pressure is required, leveling valve 156, can provide air bladders 104 with the means to exhaust air by putting the bladders 104 in fluid communication with the outside environment, thus allowing the bladders 104 to vent. The exhausting of air can be continued until the desired trailer bed level is reached and the leveling valve 156 closes.

Between compressor 150 and the air bladders 104, is an air tank 160 that can be kept under pressure so that the inflation of the air bladders 104 can be performed quicker than would be possible if they were directly connected to air compressor 150. When using air tank 160, flow from the tank can be run through the sensor 156 to the dump valve 158 (which can be implemented as a three way ball valve). In such a configuration, the leveling valve 156 has three states, an inflation state, a maintenance state and a deflation state. The choice of states is controlled by the ride height as determined by leveling valve 156. The use of a single air passage to each of the air bladders 104 (though both leveling valve 156 and dump valve 158 for both inflation and deflation, which results in an easier to install system. Dump valve 158 can be used to provide the user with the ability to control the ride height of the trailer bed, or to control the air pressure in tank 160 when the system is powered down.

In operation, a sensor 156 determines whether the trailer bed is at the desired level (ride height). The bed can be at the level, in which case, no changes to the air pressure in the air bladders is needed; it can be too high, in which case the air bladders 104 need to be deflated; or it can be too low in which case the air bladders 104 will need to be inflated. When sensor 156 determines the applicable state and selects between its three states. In a first state, a seal is effectively maintained, so that the air pressure in the bladders 104 is maintained. In a second state, the bladders 104 are put into fluid communication with the air tank 160, which is at a higher pressure than the bladders 104. The air in the system will seek to find equilibrium, and thus will flow to the air bladders 104, inflating them in the process. When the desired level has been reached, the sensor 156 will seal access to the bladders 104. In the third state, the air bladders are put into fluid communication with a lower pressure environment, which can be done by opening a valve to the open atmosphere. Once again, the air in the system will seek equilibrium, which in this case will empty the air bladders 104. In such a system the regulator 154 provides power to the compressor 150 from the power source 152 based on the air pressure in the tank 160. Dump valve 158 can be used to provide manual control of the pressure in various components of the system. In standard operation, dump valve 158 allows the air tank 160 to be in fluid communication with the air bladders 104, a communication controlled by sensor 156. However, when in a powered off state, the user may want to lower the bed of the trailer which is achieved by venting the air bladders 104 to the atmosphere. In such a case, dump valve 158 can be used to empty the bladders 104. In some embodiments, dump valve 158 can also be used to vent pressurized air stored in tank 160 if so desired.

Additional control elements including check valves, shut off valves and couplers to allow the pressure in the air tank to be released can be provided. The use of these systems will be well understood by those skilled in the art.

Numerous different types of sensors can be employed as sensor 156. In the illustrated embodiments, a leveling valve is employed to allow for the creation of a simple pneumatic control system. This valve can be preset so that there is a desired level at which the bed of the trailer is to be maintained. When the bed of the trailer is not at this level, air pressure in the bladders 104 is increased or decreased accordingly. Optionally, an air gauge 162 can be employed to measure the pressure in the suspension system, which is directly related to the pressure in bladders 104. Because the weight of the trailer bed in any given installation is constant, when the trailer bed is level the pressure of the suspension system is directly proportional to the weight of the load carried by the trailer. Thus an air gauge 162 can be employed to provide a rudimentary load scale on the trailer.

One skilled in the art will appreciate that by preventing pressurized air from filling the bladders 104, and using valve 158 to dump the air in the bladders 104, the trailer bed can be made to kneel. Because the trailer is typically supported at one end by the trailer hitch, lowering the level of the other end of the trailer by deflating the air bladders 104 can provide the kneeling functionality desired. To facilitate this change in the control rules used to level the trailer, an external controller interface 164 can be employed in some embodiments of the present invention. The external controller interface 164 can allow the user to deflate air bladders 104 without level sensor 156 triggering an inflation cycle, and it can allow the user to return the control system to a normal state and elevate the trailer bed from a kneeling position. Controller interface 164 can also provide the user with the ability to either pre-charge the air tank 160 or to evacuate the air tank 160 as desired. Those skilled in the art will appreciate that there are a number of uses for such an interface, and that providing additional functionality through the user of an external interface controller 164 does not depart from the scope of the present invention.

Though described above as using a mechanical control system regulated by a leveling valve 156, the system of the present invention can be controlled through the use of an electronic control system that can be responsive to a number of different inputs, such as the height differential between the support arms 102 and the trailer bed, the angle between the hanger brackets 100 and the support arms 102, a direct measure of the ride height, or a manual input such as one set through external controller interface 164. Those skilled in the art will appreciate that the implementation of such a system does not depart from the scope of the present invention.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. An air suspension kit for retrofitting a hub mounted light duty single fixed axle trailer having a leaf spring suspension to one having an air suspension, the kit comprising:
   first and second hanger brackets for attachment to respective first and second side rails of the trailer;
   first and second support arms for connection to the respective first and second hanger brackets, each of the support arms having a hanger bracket mount point at one end, an air bladder mounting surface at an opposing end of the arm, and a transverse recess located on one of a top and bottom surface of said arm and which is positioned between said ends for receiving said axle;
   first and second axle collars dimensioned for engagement with both the axle and recesses in each of the first and second support arms and which are each assembled from two identical half shell collar sections that along at least one longitudinal edge thereof include a centrally located edge recess thereby permitting adjacent half shell collar sections through said recess to be simultaneously welded together and to said axle, and welded separately to said support arms;
   first and second inflatable air bladders for connection to the air bladder mounting surface of the first and second support arms respectively and for connection to the first and second side rails respectively, each air bladder for increasing and decreasing the distance between the respective side rail and support arm in accordance with the quantity of air stored in the bladder; and
   an inflation control system for controlling air flow into and out of the first and second air bladders to maintain alignment of the side rails and support arms in a predetermined configuration.

2. The kit of claim 1 further including first and second shock absorbers, each of the shock absorbers for connection between a respective hanger bracket and support arm.

3. The kit of claim 1, wherein the centrally located edge recess is sized such that the two identical half shell collar sections, when welded, have a continuous outer surface along a longitudinal length thereof.

4. The kit of claim 1 wherein the trailer is a utility trailer.

5. The kit of claim 1 wherein the trailer is a camper trailer.

6. The kit of claim 1 wherein the trailer is a recreational vehicle trailer.

* * * * *